United States Patent
Homma et al.

(10) Patent No.: US 10,505,221 B2
(45) Date of Patent: Dec. 10, 2019

(54) SOLID ELECTROLYTE AND FABRICATION METHOD THEREFOR, AND ALL-SOLID-STATE SECONDARY BATTERY AND FABRICATION METHOD THEREFOR

(71) Applicant: FUJITSU LIMITED, Kawasaki-shi, Kanagawa (JP)

(72) Inventors: Kenji Homma, Atsugi (JP); Satoru Watanabe, Atsugi (JP); Tamotsu Yamamoto, Tachikawa (JP)

(73) Assignee: FUJITSU LIMITED, Kawasaki (JP)

(*) Notice: Subject to any disclaimer, the term of this patent is extended or adjusted under 35 U.S.C. 154(b) by 130 days.

(21) Appl. No.: 15/440,338

(22) Filed: Feb. 23, 2017

(65) Prior Publication Data
US 2017/0162903 A1    Jun. 8, 2017

Related U.S. Application Data

(63) Continuation of application No. PCT/JP2014/072608, filed on Aug. 28, 2014.

(51) Int. Cl.
*H01M 10/0562* (2010.01)
*C04B 35/462* (2006.01)
(Continued)

(52) U.S. Cl.
CPC ....... *H01M 10/0562* (2013.01); *C04B 35/462* (2013.01); *C04B 35/62828* (2013.01);
(Continued)

(58) Field of Classification Search
CPC .......... H01M 10/0562; H01M 10/052; H01M 2300/0071; H01M 4/13; H01M 6/187; H01M 8/1016; C04B 2235/3203; C04B 2235/3227; C04B 35/462; C04B 2235/3232; C04B 2235/2334
See application file for complete search history.

(56) References Cited

U.S. PATENT DOCUMENTS

2003/0031923 A1* 2/2003 Aoshima ............... H01M 2/021
429/127
2009/0068563 A1 3/2009 Kanda
(Continued)

FOREIGN PATENT DOCUMENTS

CN  103000934 A  3/2013
JP  H07-169456  7/1995
(Continued)

OTHER PUBLICATIONS

International Search Report for International Application No. PCT/JP2014/072608 dated Sep. 30, 2014.
(Continued)

*Primary Examiner* — Imran Akram
(74) *Attorney, Agent, or Firm* — Kratz, Quintos & Hanson, LLP

(57) ABSTRACT

A solid electrolyte includes a particle having a first portion that includes, as constituent elements, lanthanum (La), lithium, titanium and oxygen, and a second portion that covers a surface of the first portion and includes, as constituent elements, lanthanum, lithium, titanium and oxygen and in which sulfur is coupled to an oxygen deficient portion and at least a surface is oxidized.

4 Claims, 10 Drawing Sheets

(51) Int. Cl.
  C04B 35/628 (2006.01)
  H01M 10/0525 (2010.01)
  H01M 10/052 (2010.01)
  H01B 1/08 (2006.01)

(52) U.S. Cl.
  CPC ..... *H01M 10/052* (2013.01); *H01M 10/0525* (2013.01); *C04B 2235/3203* (2013.01); *C04B 2235/3227* (2013.01); *C04B 2235/3234* (2013.01); *H01B 1/08* (2013.01); *H01M 2300/0071* (2013.01)

(56) References Cited

U.S. PATENT DOCUMENTS

| | | | |
|---|---|---|---|
| 2012/0219844 A1* | 8/2012 | Tsutsumi | H01G 11/06 429/153 |
| 2013/0140502 A1* | 6/2013 | Tomai | C04B 35/01 252/518.1 |
| 2013/0189588 A1 | 7/2013 | Yada | |
| 2014/0065464 A1* | 3/2014 | Masarapu | H01M 4/134 429/149 |
| 2014/0193695 A1 | 7/2014 | Hoshina | |
| 2015/0180050 A1 | 6/2015 | Nakashima et al. | |

FOREIGN PATENT DOCUMENTS

| | | |
|---|---|---|
| JP | 2008-059843 A1 | 3/2008 |
| JP | 2009-245913 A1 | 10/2009 |
| JP | 2011-222415 A1 | 11/2011 |
| JP | 2013-140762 A1 | 7/2013 |
| JP | 2013-151721 A1 | 8/2013 |
| WO | 2013/136446 A1 | 9/2013 |
| WO | 2014017322 A1 | 1/2014 |

OTHER PUBLICATIONS

Extended European Search Report for counterpart EPC Patent Application No. 14900776.7 dated Dec. 13, 2017 (11 Sheets).
A. Mei, et al.; "Role of amorphous boundary layer in enhancing ionic conductivity of lithium-lanthanum-titanate electrolyte;" Electrochimica Acta; vol. 55; No. 8; Mar. 1, 2010; pp. 2958-2963 (6 Sheets).

* cited by examiner

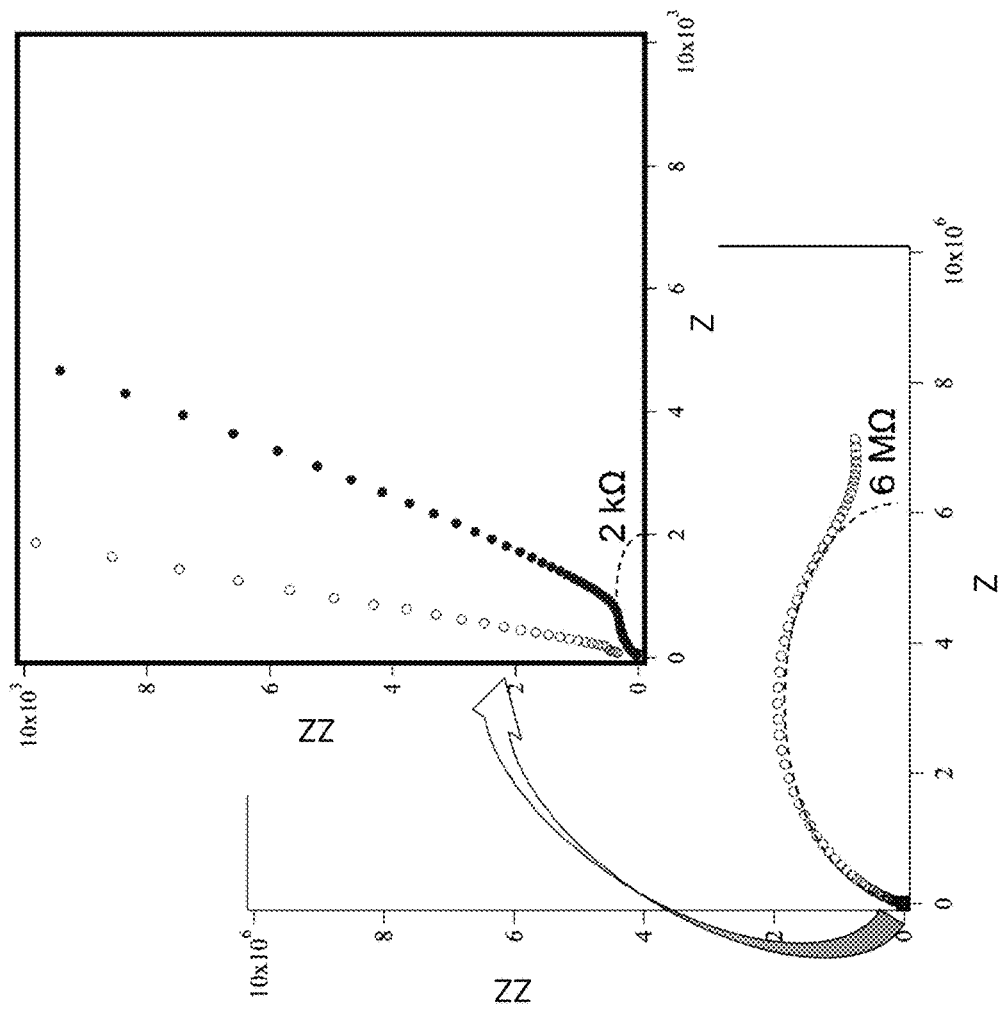

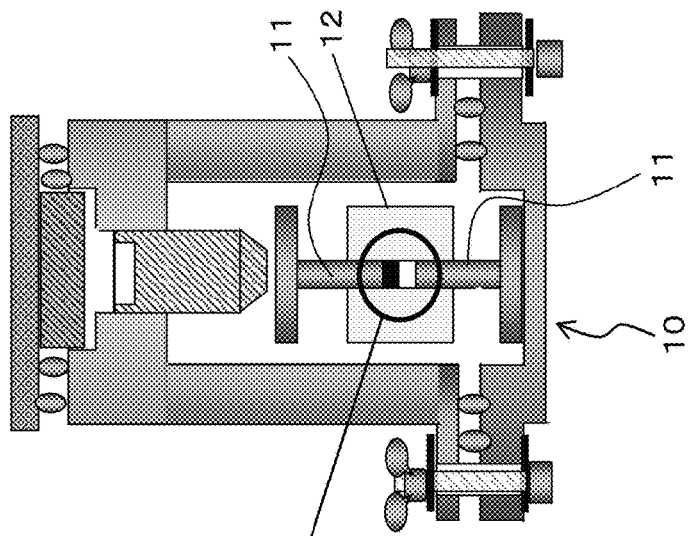
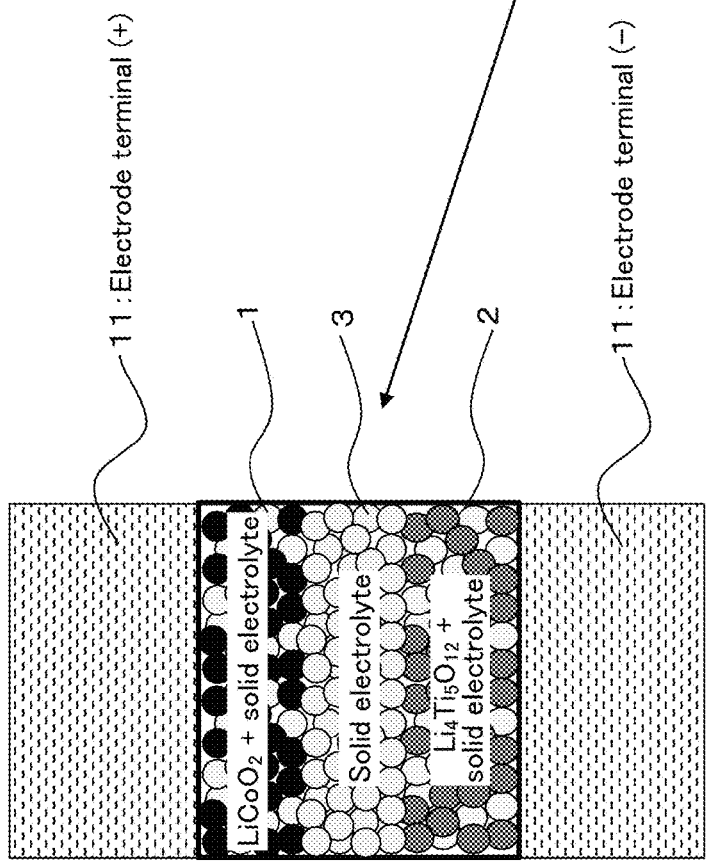
FIG. 9A
FIG. 9B

SOLID ELECTROLYTE AND FABRICATION METHOD THEREFOR, AND ALL-SOLID-STATE SECONDARY BATTERY AND FABRICATION METHOD THEREFOR

CROSS-REFERENCE TO RELATED APPLICATION

This application is a continuation application of International Application PCT/JP2014/072608 filed on Aug. 28, 2014 and designated the U.S., the entire contents of which are incorporated herein by reference.

FIELD

The embodiments discussed herein are related to a solid electrolyte and a fabrication method therefor and an all-solid-state secondary battery and a fabrication method therefor.

BACKGROUND

A secondary battery that is safe and high in reliability under any global environment is demanded for an environmental power generation technology by which electricity generated by small energy such as sun light, vibration and a body temperature of a person or an animal is accumulated and utilized for a sensor or as wireless origination power.

In a liquid secondary battery utilized widely at present, it is concerned that, if the number of cycles of its use increases, then a positive-electrode active material may degrade to decrease the battery capacity or an organic electrolyte in the battery may be ignited by battery short-circuiting arising from formation of dendrite.

Therefore, a secondary battery that uses a liquid electrolyte is poor in reliability and safety where it is tried to use the secondary battery in an environmental power generation device whose utilization, for example, for 10 years or more is expected.

Therefore, attention is paid to an all-solid-state secondary battery in which all constituent materials are solid. The all-solid-state secondary battery has no possibility of liquid leakage, ignition and so forth and is excellent also in a cycle characteristic.

For example, as a solid electrolyte for use with an all-solid-state secondary battery, a solid electrolyte for which an oxide such as LaLiTiO is used is available.

SUMMARY

A solid electrolyte includes a particle having a first portion that includes, as constituent elements, lanthanum (La), lithium (Li), titanium (Ti) and oxygen (O), and a second portion that covers a surface of the first portion and includes, as constituent elements, lanthanum (La), lithium (Li), titanium (Ti) and oxygen (O) and in which sulfur (S) is coupled to an oxygen deficient portion and at least a surface is oxidized.

An all-solid-state secondary battery includes a positive electrode, a negative electrode, and a solid electrolyte provided between the positive electrode and the negative electrode, wherein the solid electrolyte includes a particle having a first portion that includes, as constituent elements, lanthanum (La), lithium (Li), titanium (Ti) and oxygen (O), and a second portion that covers a surface of the first portion and includes, as constituent elements, lanthanum (La), lithium (Li), titanium (Ti) and oxygen (O) and in which sulfur (S) is coupled to an oxygen deficient portion and at least a surface is oxidized.

A fabrication method for a solid electrolyte, including performing a reduction process for a solid electrolyte material in the form of powder that includes, as constituent elements, lanthanum (La), lithium (Li), titanium (Ti) and oxygen (O), performing a sulfurization process for the solid electrolyte material having an oxygen deficient portion generated by the reduction process, performing a surface oxidization process for the solid electrolyte material having a surface portion at which sulfur (S) is coupled to the oxygen deficient portion formed by the sulfurization process, and fabricating a solid electrolyte by performing compaction molding for the solid electrolyte material in which at least a surface of the surface portion is oxidized by the surface oxidization process.

A fabrication method for an all-solid-state secondary battery, including performing a reduction process for a solid electrolyte material in the form of powder that includes, as constituent elements, lanthanum (La), lithium (Li), titanium (Ti) and oxygen (O), performing a sulfurization process for the solid electrolyte material having an oxygen deficient portion generated by the reduction process, performing a surface oxidization process for the solid electrolyte material having a surface portion at which sulfur (S) is coupled to the oxygen deficient portion formed by the sulfurization process, and fabricating an all-solid-state secondary battery by performing compaction molding for the solid electrolyte material in which at least a surface of the surface portion is oxidized by the surface oxidization process in a state in which the solid electrolyte material is placed between a positive electrode material and a negative electrode material.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6A is a view illustrating a result of measurement of the impedance and calculation of an ionic conductivity of the solid electrolyte after sulfurization treatment of the example and FIG. 6B is a view illustrating a result of measurement of the impedance and calculation of an ionic conductivity of the solid electrolyte after surface oxidation treatment (after surface modification) of the example;

FIGS. 9A and 9B are views illustrating a production method of an all-solid-state secondary battery of the example.

DESCRIPTION OF EMBODIMENTS

However, such a solid electrolyte for which an oxide such as LaLiTiO is used as described above is, when it is in a powder state, very high in intergranular resistance (grain boundary resistance) and low in ionic conductivity between particles. Therefore, even if an all-solid-state secondary battery is fabricated using such a solid electrolyte as just described, the internal resistance of the all-solid-state secondary battery is high and it is difficult to obtain a sufficient output characteristic (load characteristic).

Therefore, it seems prospective to perform sintering at such a high temperature as, for example, approximately 1000° C. or more to couple particles to each other to decrease the intergranular resistance and enhance the ionic conductivity between particles thereby to reduce the internal resistance and enhance an output characteristic of the all-solid-state secondary battery.

However, if sintering is performed at a high temperature, then an electrode material suffers from decomposition and solid solution, which degenerate the electrode and disable operation as the all-solid-state secondary battery.

Therefore, it is desired to implement a solid electrolyte that is reduced in intergranular resistance and enhanced in ionic conductivity between particles without performing sintering at a high temperature and hence to implement an all-solid-state secondary battery that is reduced in internal resistance and enhanced in output characteristic.

In the following, a solid electrolyte and a fabrication method therefor and an all-solid-state secondary battery and a fabrication method therefor according to an embodiment are described with reference to the drawings.

In the embodiment described below, an all-solid-state lithium secondary battery is taken as an example of the all-solid-state secondary battery.

Figure 2:
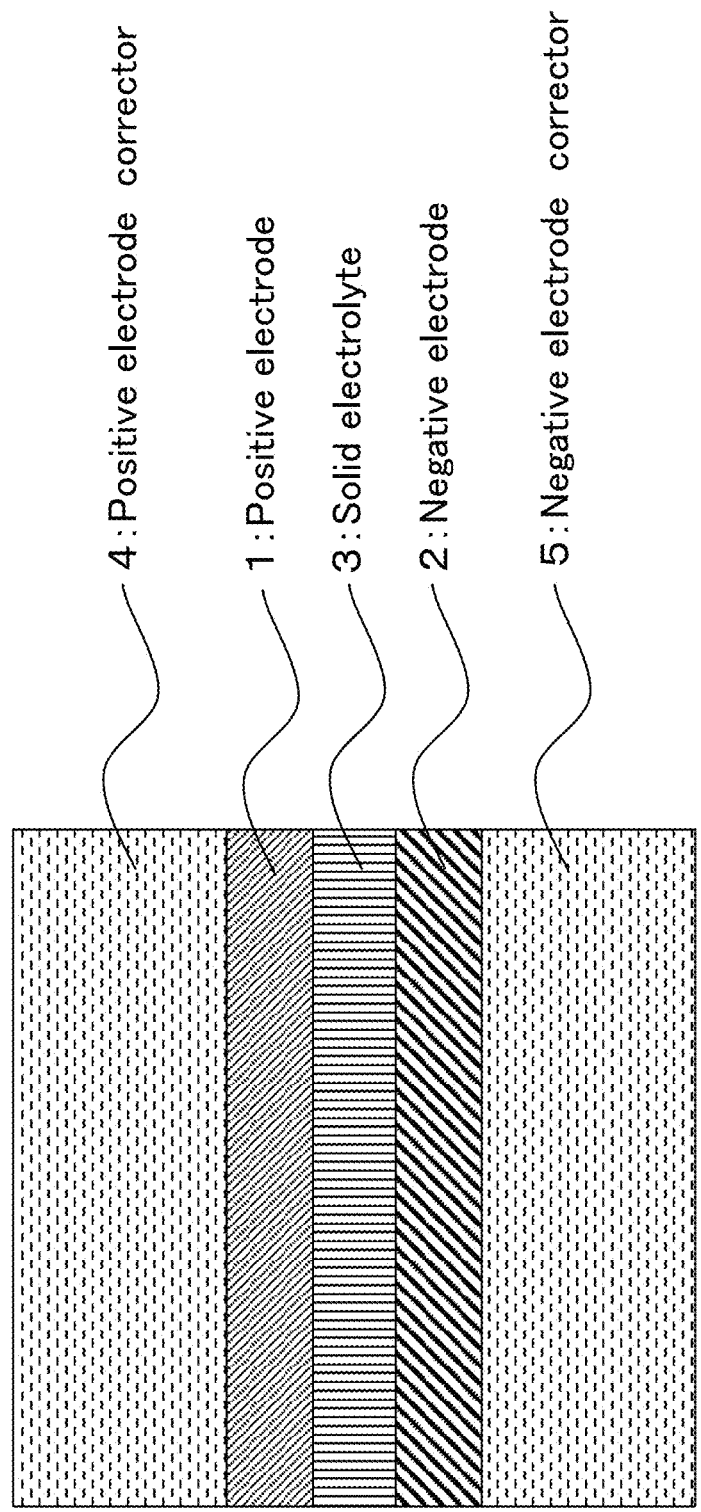
FIG. 2 is a schematic sectional view depicting a configuration of an all-solid-state secondary battery according to the embodiment.

In the present embodiment, as depicted in FIG. 2, the all-solid-state lithium secondary battery includes a positive electrode 1, a negative electrode 2, solid electrolyte 3 provided between the positive electrode 1 and the negative electrode 2, a positive electrode collector 4 and a negative electrode collector 5. Preferably, such an all-solid-state lithium secondary battery as just described is incorporated, for example, in an environmental power generation apparatus.

Here, the positive electrode 1 contains a positive-electrode active material. Here, the positive electrode 1 contains, for example, $LiCoO_2$ (oxidized positive-electrode active material) as the positive active material. In particular, the positive electrode 1 is configured from a material in which $LiCoO_2$ and a solid electrolyte material (oxide solid electrolyte material) are mixed at a ratio of 6:4.

The negative electrode 2 contains a negative-electrode active material. Here, the negative electrode 2 contains, for example, $Li_4Ti_5O_{12}$ (oxide negative-electrode active material) as the negative-electrode active material. In particular, the negative electrode 2 is configured from a material in which $Li_4Ti_5O_{12}$ and a solid electrolyte material (oxide solid electrolyte material) are mixed at a ratio of 6:4.

Figure 1:
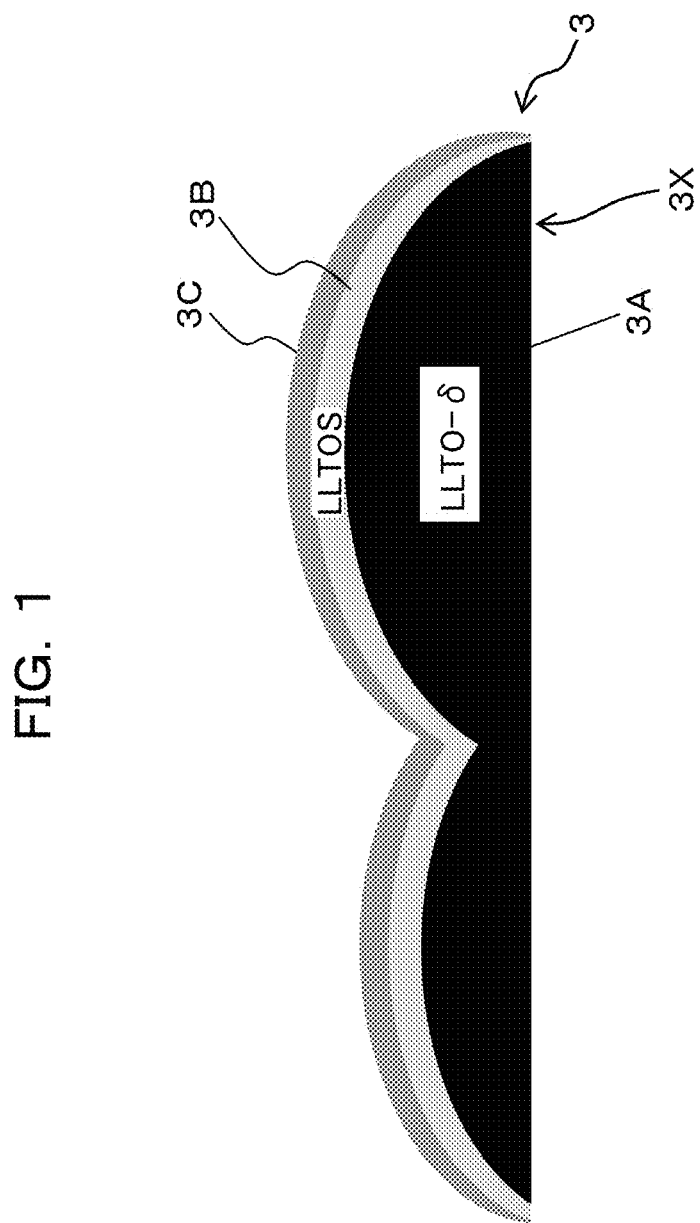
FIG. 1 is a schematic sectional view depicting a configuration of particles included in a solid electrolyte according to an embodiment.

As depicted in FIG. 1, the solid electrolyte 3 contains, as constituent elements, lanthanum (La), lithium (Li), titanium (Ti) and oxygen (O) and includes a particle 3X that has a surface portion 3B in which sulfur (S) is coupled to an oxygen deficient portion (oxygen defect portion) and which is oxidized at least at the surface 3C thereof. It is to be noted that the solid electrolyte 3 is referred to also as lithium ion conductor or oxide solid electrolyte.

Here, the solid electrolyte 3 is configured from a crystal material containing, as constituent elements, lanthanum (La), lithium (Li), titanium (Ti) and oxygen (O), and is formed by compaction molding of a solid electrolyte material (LaLiTiO; for example, $La_{0.55}Li_{0.33}TiO_3$; LLTO) in the form of powder.

Further, the solid electrolyte 3 includes the powder 3X that has a first portion (LLTO) 3A that contains, as constituent elements, lanthanum (La), lithium (Li), titanium (Ti) and oxygen (O) and a second portion (LaLiTiOS; LLTOS) 3B that contains, as constituent elements, lanthanum (La), lithium (Li), titanium (Ti) and oxygen (O), has sulfur (S) coupled to an oxide deficient portion thereof and is oxidized at least at the surface 3C thereof.

It is to be noted here that the first portion (LLTO) 3A that contains, as constituent elements, lanthanum (La), lithium (Li), titanium (Ti) and oxygen (O) is a first portion (LLTO-δ) that contains, as constituent elements, lanthanum (La), lithium (Li), titanium (Ti) and oxygen (O) and has an oxide deficient portion. Further, the second portion 3B that contains, as constituent elements, lanthanum (La), lithium (Li), titanium (Ti) and oxygen (O) and has sulfur (S) coupled to the oxide deficient portion thereof contains, as constituent elements, lanthanum (La), lithium (Li), titanium (Ti), oxygen (O) and sulfur (S). Further, the surface portion in which sulfur (S) is coupled to the oxide deficient portion, namely, the second portion 3B, is a portion that contains, as constituent elements, lanthanum (La), lithium (Li), titanium (Ti) and oxygen (O) and in which oxide (O) is partly replaced by sulfur (S). In particular, the surface portion in which sulfur (S) is coupled to the oxide deficient portion, namely, the second portion 3B, is a portion obtained by sulfurization of the surface of the particle 3X of the solid electrolyte material in the form of powder, namely, a portion obtained by sulfurization of the oxide deficient portion. Therefore, the particle 3X of the solid electrolyte material in the form of powder has a structure that the surface thereof is covered with the portion 3B obtained by sulfurization of the oxide deficient portion.

Here, a surface portion, namely, a portion other than the oxidized portion 3C of the second portion 3B, has a defect that traps a lithium ion.

Further, the portion other than the surface portion 3B, namely, the first portion 3A, has an oxide deficient portion and has an electron conductivity.

Here, if the solid electrolyte material is $La_{0.55}Li_{0.33}TiO_{3-\delta}$ and the oxide (O) composition ratio is 3-δ, then the amount of the oxide deficient portion (oxide deficient amount; oxide defect amount) δ is 0.04 to 0.5 (δ=0.04 to 0.5). Here, the oxide deficient amount δ is 0.04 if it is assumed that this is based on a result (refer to FIG. 4) of TG-DTA measurement hereinafter described in connection with an example and besides Ti only compensates for charge neutrality by +3/+4. Further, where the valence of all titanium (Ti) changes from tetravalent to trivalent, theoretically the oxide deficient amount $\delta$ becomes maximum and is 0.5.

Further, the thickness of the surface portion in which sulfur (S) is coupled to the oxide deficient portion, namely, of the second portion 3B, is, for example, approximately 10 nm as hereinafter described in connection with the example.

With such a solid electrolyte 3 as described above, the intergranular resistance can be decreased to enhance the ionic conductivity between particles.

Incidentally, such a solid electrolyte 3 as described above can be fabricated in the following manner.

Figure 3A:
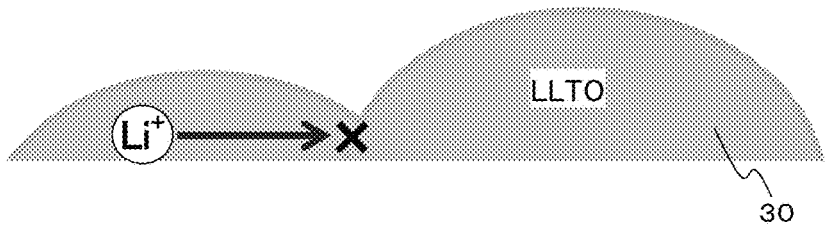
FIGS. 3A to 3D are schematic sectional views illustrating a fabrication method for a solid electrolyte according to the embodiment.
Figure 3B:
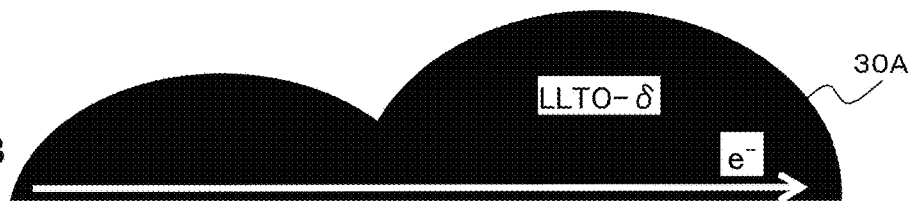

In particular, a reduction treatment is first performed for a solid electrolyte material (LaLiTiO; for example, $La_{0.55}Li_{0.33}TiO_3$; LLTO) 30 in the form of powder containing, as constituent elements, lanthanum (La), lithium (Li), titanium (Ti) and oxygen (O) as depicted in FIGS. 3A and 3B. Consequently, a solid electrolyte material 30A having an oxide deficient portion is produced.

Figure 3C:
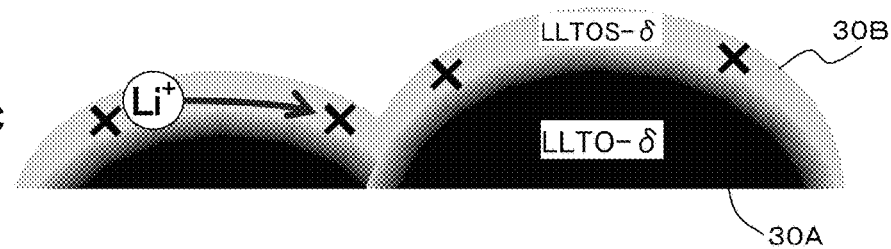

Then, as depicted in FIG. 3C, a sulfurization treatment is performed for the solid electrolyte material 30A having the oxide deficient portion generated by the reduction treatment. Consequently, the surface of the particle of the solid electrolyte material 30A in the form of powder is sulfurized. In particular, the solid electrolyte material 30A has a surface portion 30B in which sulfur (S) is coupled to the oxide deficient portion, namely, a surface portion 30B in which oxide (O) is partly replaced by sulfur (S).

Figure 3D:
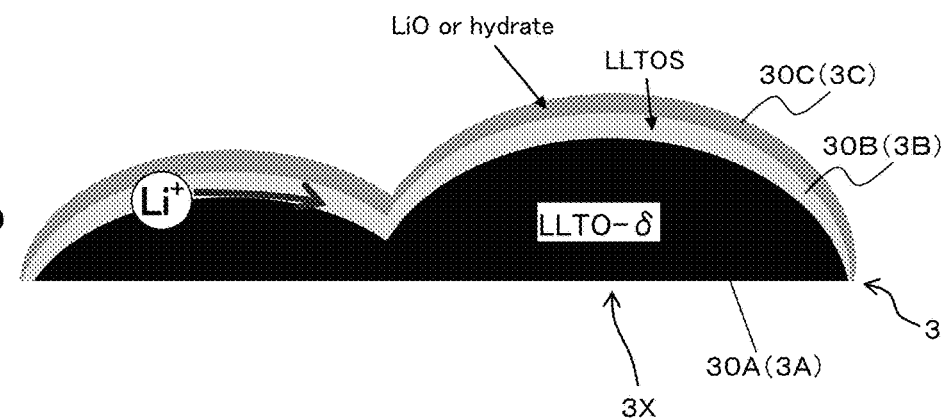

Then, as depicted in FIG. 3D, a surface oxidation treatment is performed for the solid electrolyte material 30A that has the surface 30B on which sulfur (S) is coupled to the oxide deficient portion formed by the sulfurization treatment, namely, the surface portion 30B in which oxide (O) is partly replaced by sulfur (S). Consequently, in the solid electrolyte material 30A, at least the surface 30C of the surface portion 30B is oxidized.

Here, the surface oxidation treatment is performed by placing the solid electrolyte material 30A into an environment in which at least the surface 30C of the surface portion 30B of the solid electrolyte material 30A is oxidized with water.

Then, the solid electrolyte 3 is fabricated by performing compaction molding of the solid electrolyte material 30A in which at least the surface 30C of the surface portion 30B is oxidized by the surface oxidation treatment. In this case, a portion indicated by reference character 30A is the first portion 3A having the oxide deficient portion of the particle 3X provided in the solid electrolyte 3 described above. Further, another portion indicated by reference character 30B is the second portion 3B that covers the surface of the first portion 3A of the particle 3X provided in the solid electrolyte 3 described above. Furthermore, a portion indicated by reference character 30C is the surface 3C of the second portion 3B of the particle 3X provided in the solid electrolyte 3 described above. In short, the particle 3X provided in the solid electrolyte 3 has the first portion (LLTO-$\delta$) 3A having the oxide deficient portion, and the second portion (LLTOS) 3B that covers the surface of the first portion 3A and whose surface 3C is oxidized.

The solid electrolyte 3 in which intergranular resistance is decreased and the ionic conductivity between particles is enhanced can be fabricated in such a manner as described above without performing sintering at a high temperature.

In short, as depicted in FIG. 3A, an oxide solid electrolyte such as, for example, LLTO has, in a powder state thereof, a very high intergranular resistance (grain boundary resistance) and a low ionic conductivity between particles. Therefore, by reforming the surface of the LLTO 30 that is a solid electrolyte material in such a manner as described below, the intergranular resistance is decreased and the ionic conductivity between particles is increased without performing sintering at a high temperature.

In particular, as depicted in FIGS. 3A and 3B, titanium (Ti) in crystal is reduced from tetravalence to trivalence by performing thermal treatment for the solid electrolyte material (LLTO) 30, for example, with hydrogen gas. By such reduction of titanium (Ti) as just described, oxygen is desorbed to generate an oxygen deficient portion in crystal.

However, the crystal (LLTO-$\delta$) 30A in which titanium (Ti) is reduced to tetravalence and the oxygen deficient portion is generated in such a manner as just described indicates an electron conductivity. Therefore, it is difficult to use the crystal 30A as the solid electrolyte 3 of an all-solid-state secondary battery.

Therefore, as depicted in FIG. 3C, by sulfurizing (reoxidizing) reduced titanium (Ti) of tetravalence of the solid electrolyte material (LLTO-$\delta$) 30A having the oxygen deficient portion with the sulfur (S), the valence is returned to tetravalence to cause the electron conductivity to disappear while only the ionic conductivity is indicated.

However, in the solid electrolyte material (LLTO-$\delta$) 30A having the portion (LLTO-$\delta$) 30B at which oxygen (O) is partly replaced by sulfur (S) in such a manner as described above, a great amount of deficiency is involved in the portion 30B at which oxygen (O) is partly replaced by sulfur (S), and the deficiency traps lithium ions (Li$^+$). Therefore, it is difficult to achieve a high ionic conductivity.

Therefore, as depicted in FIG. 3D, by oxidizing, with water, at least the surface 30C of the portion 30B (LLTO-$\delta$) that has the deficiency that traps lithium ions (Li$^+$) and in which oxygen (O) is partly replaced by sulfur (S), the deficiency that traps lithium ions (Li$^+$) is suppressed and the lithium ions (Li$^+$) perform surface conduction between particles. For example, by oxidization with water, the deficiency in the portion (LLTO-$\delta$) 30B at which oxygen (O) is partly replaced by sulfur (S) disappears (LLTOS) and a layer of, for example, LiO or a hydrate is formed on the surface portion 30C thereby to allow surface conduction of lithium ions (Li$^+$) between particles. As a result, as hereinafter described in connection with an example, although the ionic conductivity before oxidization with water is approximately $10^{-8}$ S/cm, the ionic conductivity is improved to approximately $10^{-5}$ S/cm by oxidization with water.

By reforming the surface of LLTO that is a solid electrolyte material in such a manner as described above, the intergranular resistance can be decreased and the ionic conductivity between particles can be enhanced without performing sintering at a high temperature. In particular, as hereinafter described in connection with an example, the solid electrolyte material has a very high intergranular resistance unique to an oxide, and while the ionic conductivity before reforming is approximately $10^{-8}$ S/cm, it is improved to approximately $10^{-5}$ S/cm by reforming.

Incidentally, an all-solid-state secondary battery can be fabricated using the solid electrolyte 3 obtained in such a manner as described above.

In particular, the solid electrolyte material (here, powder) obtained in such a manner as described above is sandwiched between a positive electrode material (here, powder) and a negative electrode material (here, powder) to perform compaction molding thereby to fabricate an all-solid-state secondary battery.

In this manner, an all-solid-state secondary battery can be fabricated only by compaction molding, namely, by pressing to each other by pressurization at a room temperature without performing sintering at a high temperature, for example, of approximately 1000° C. or more.

In particular, by reforming the surface of a solid electrolyte material in such a manner as described above, the ionic conductivity can be improved from approximately $10^{-8}$ S/cm to approximately $10^{-5}$ S/cm. Therefore, sintering at a high temperature, for example, of 1000° C. or more may not be performed anymore to couple particles to each other in order to decrease the intergranular resistance and improve the ionic conductivity between particles. Further, only by sandwiching the solid electrolyte material fabricated in such a manner as described above between a positive electrode material and a negative electrode material to perform compaction molding, an all-solid-state secondary battery can be fabricated at a room temperature. Since the all-solid-state secondary battery can be fabricated at a room temperature, namely, since the battery fabrication temperature that is a molding temperature of 1000° C. or more can be made equal to a room temperature, such a situation can be suppressed that an electrode material suffers from decomposition or solid solution thereby to degenerate the electrode until the battery does not operate as an all-solid-state secondary battery as in the case where sintering is performed at a high temperature. In this manner, a method for coupling particles at a temperature of 500° C. or less at which an electrode material does not suffer from decomposition or solid solution to fabricate an all-solid-state secondary battery can be implemented.

Accordingly, the solid electrolyte and fabrication method therefor and the all-solid-state secondary battery and fabrication method therefor according to the present embodiment have advantages in that the solid electrolyte 3 that decreases intergranular resistance and enhances the ionic conductivity between particles can be implemented without performing sintering at a high temperature and hence the all-solid-state secondary battery that decreases the internal resistance and enhances the output characteristic can be implemented.

On the other hand, a solid electrolyte for which an oxide such as, for example, LaLiTiO is used is, in a powder state thereof, very high in intergranular resistance (grain boundary resistance) and is low in ionic conductivity between particles. Therefore, even if an all-solid-state secondary battery (all-solid-state lithium secondary battery) is fabricated using such a solid electrolyte as just described, the internal resistance of the all-solid-state secondary battery is so high that it is difficult to obtain a sufficient output characteristic. In short, an oxide solid electrolyte is, in a powder state, very high in intergranular resistance, and where it is incorporated into an all-solid-state secondary battery, it is difficult to obtain sufficient current from the battery.

It is to be noted that, the present technology is not limited to the embodiment specifically described above, and variations and modifications can be made without departing from the scope of the present invention.

EXAMPLES

In the following, the embodiment is described in more detail in connection with examples. However, the present embodiment is not limited to the examples described below.

[Surface Reforming and Evaluation of Solid Electrolyte]

First, a heat treatment (hydrogen heat treatment; for example, for approximately 30 minutes) was performed for LLTO ($La_{0.55}Li_{0.33}TiO_3$) powder fabricated by Toshima Manufacturing in a hydrogen gas atmosphere of approximately 800° C. to approximately 900° C. to reduce titanium (Ti) to generate an oxygen deficient portion.

Figure 4:
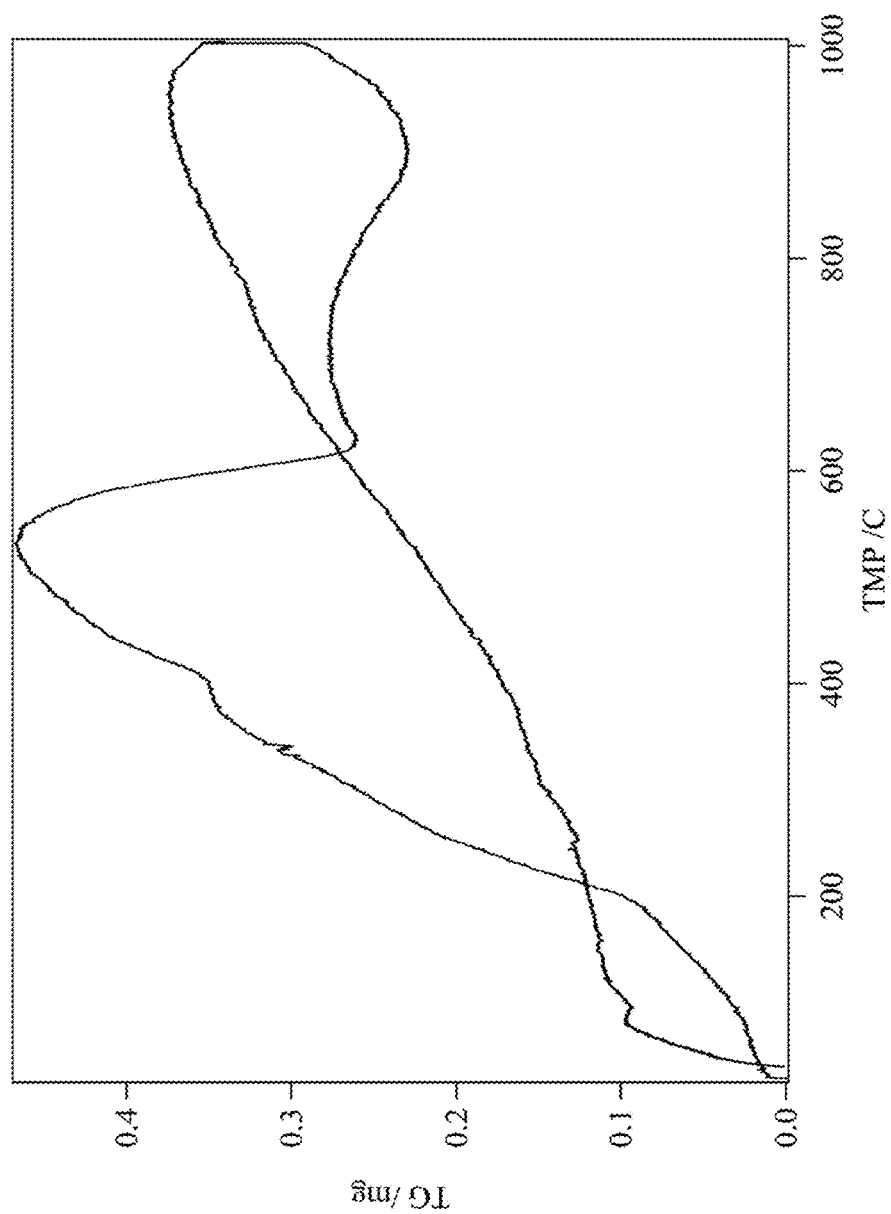
FIG. 4 is a view depicting a result of measurement of a TG-DTA of a solid electrolyte after hydrogen heat treatment of an example.

Here, when thermogravimetry-differential thermal analysis (TG-DTA) measurement was performed for the LLTO after the hydrogen heat treatment, such a result as depicted in FIG. 4 was obtained. If it is assumed that the temperature returned to 550° C., then since the amount $\delta$ of the oxygen deficient portion of $La_{0.55}Li_{0.33}TiO_{3-\delta}$ exhibits a weight increase is 0.4%, the increasing amount is 0.69 g/mol and $\delta$ is 0.04. Here, $La_{0.55}Li_{0.33}TiO_3$ is 174.55 g/mol and O is 15.999 g/mol. Here, it is assumed that Ti only compensates for charge neutrality by +3/+4. Further, where the valence of all titanium (Ti) changes from tetravalence to trivalence, theoretically the oxygen deficient amount $\delta$ becomes maximum and 0.5. Here, for the TG-DTA measurement, the apparatus named Rigaku TG8120 was used, and the increasing and decreasing rate of the temperature was set to 10° C./min; the atmosphere was set to dry Ar 100% dew-point (−40° C. or less); the sample amount was set to 13.39 mg; and the sample PAN was set to Pt.

Figure 5A:
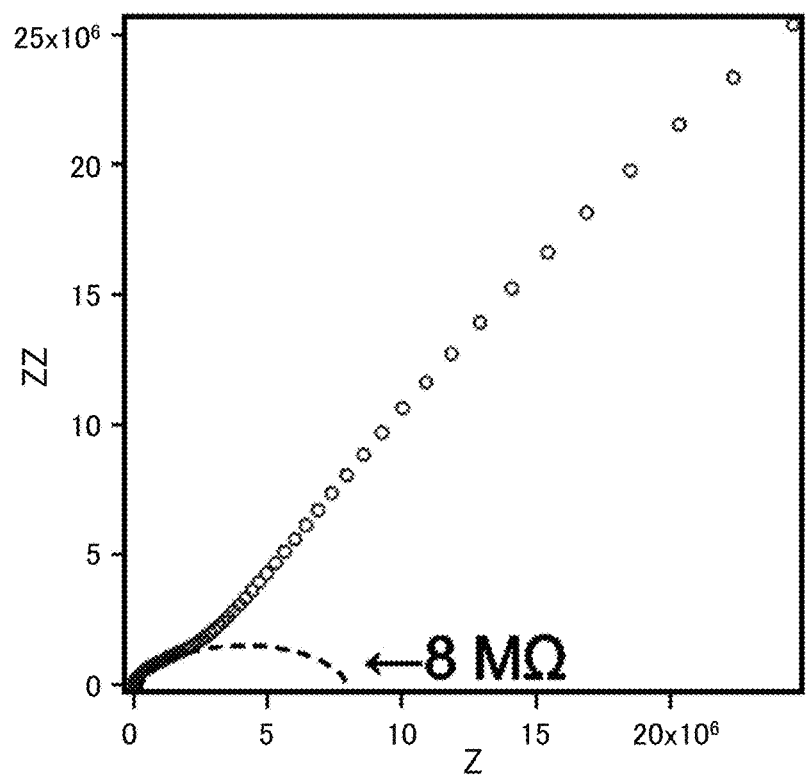
FIG. 5A is a view illustrating a result of measurement of the impedance and calculation of an ionic conductivity of the solid electrolyte before the hydrogen heat treatment of the example.
Figure 5B:
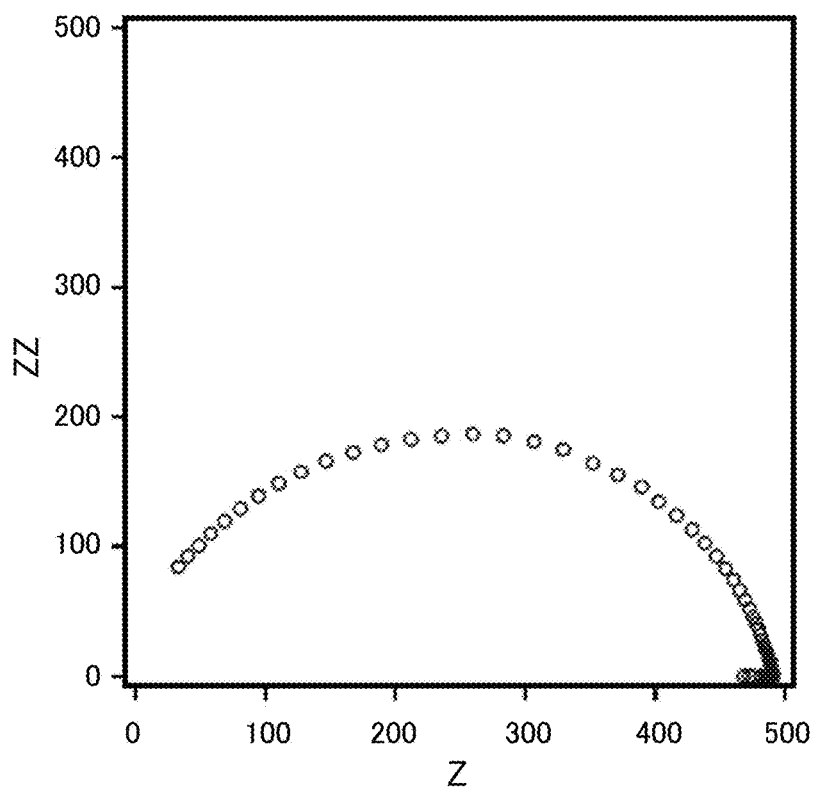
FIG. 5B is a view illustrating a result of measurement of the impedance and calculation of an ionic conductivity of the solid electrolyte after the hydrogen heat treatment of the example.

As a result of generation of the oxygen deficient portion in such a manner as described above, an electron conductivity was obtained. Here, before hydrogen heat treatment, similarly as in evaluation of the ionic conductivity hereinafter described, impedance measurement was performed using an AC impedance method, and, by extrapolating one semicircular arc and setting an intersection point between the right end of the semicircular arc and the Z axis as a grain boundary resistance (here, 8 MΩ) as depicted in FIG. 5A, and then setting t=0.05 cm and S=0.785 cm$^2$, the ionic conductivity was calculated by an expression hereinafter described. As a result of the calculation, an ionic conductivity of approximately $3.0 \times 10^{-8}$ S/CM was obtained. Then, when impedance measurement was performed using an AC impedance method after hydrogen heat treatment, the intersection point with the Z axis was 500Ω and the electron conductivity was approximately $1.2 \times 10^{-4}$ S/cm as depicted in FIG. 5B. Thus, a mixture conductor having an electron conductivity was obtained. In short, when impedance measurement was performed using an AC impedance method after hydrogen heat treatment, the diffusion resistance unique to the ion conductor was not found but was converged to the real axis, and a change to an electron conductor was found.

Then, LLTO having an electron conductivity and elemental sulfur (S) were mixed at 10:1 in weight ratio in a glove box and then enclosed at approximately 10 Pa into a quartz ampoule, in which sulfurization treatment was performed at approximately 300° C. Thereafter, the product was removed from the quartz ampoule in an dry Ar atmosphere.

Here, after the sulfurization treatment, impedance measurement was performed using an AC impedance method, by extrapolating one semicircular arc and setting an intersection point between the right end of the semicircular arc and the Z axis as a grain boundary resistance (here, 6 MΩ) as depicted in FIG. 6A and then setting t=0.05 cm and S=0.785 cm$^2$, the ionic conductivity was calculated by an expression hereinafter described. As a result of the calculation, the ionic conductivity was approximately $10.0 \times 10^{-8}$ S/cm. In this manner, the sample for which the sulfurization treatment was performed lost an electron conductivity and recovered an ionic conductivity.

Thereafter, the sample for which the sulfurization treatment was performed was placed statically in an environment of a temperature of 23° C. and a relative humidity of 55%

RH for approximately 12 hours, and then a surface oxidization treatment was performed thereby to obtain a solid electrolyte (powder) having a reformed surface.

After the surface oxidization treatment was performed in such a manner as described above, impedance measurement was performed using an AC impedance method, and by extrapolating one semicircular arc and setting an intersection point between the right end of the semicircular arc and the Z axis as a grain boundary resistance (here, 2 kΩ) as depicted in FIG. 6B and then setting t=0.05 cm and S=0.785 cm$^2$, the ionic conductivity was calculated by an expression hereinafter described. As a result of the calculation, the ionic conductivity was approximately $3.1 \times 10^{-5}$ S/cm. In this manner, by performing the surface oxidization treatment, the ionic conductivity increased by three figures from $10^{-8}$ S/cm to $10^{-5}$ S/cm in comparison with those before the surface oxidization treatment was performed. It is to be noted that, in FIG. 6B, the impedance of the sample before the surface oxidization treatment after the sulfurization treatment was plotted by blank circles and the impedance of the sample after the surface oxidization treatment was plotted by dark circles. Further, in FIG. 6B, the impedance plotted by blank circles is indicated in an enlarged scale from part of the impedance depicted in FIG. 6A.

Figures 7A, 7B:
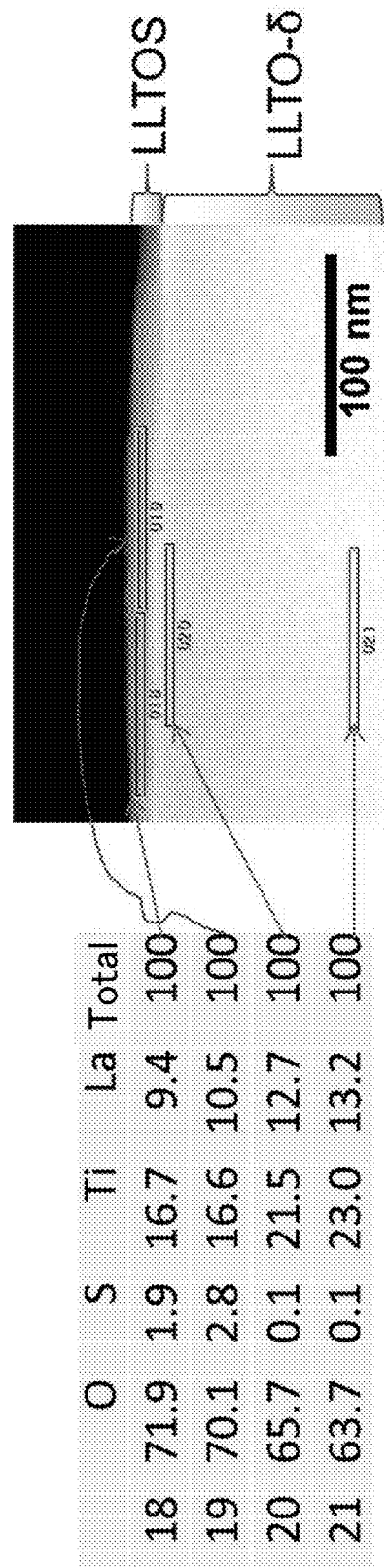
FIG. 7A is a view depicting a sectional TEM image of a particle of the solid electrolyte after the surface oxidation treatment (after surface modification) of the example and FIG. 7B is a view depicting an element distribution at several points.

Further, a sectional TEM (transmission electron microscope) image of a particle of the solid electrolyte obtained by the surface oxidization treatment in such a manner as described above was acquired, and EDS (Energy Dispersive Spectroscopy) measurement was performed to investigate an element distribution at points 18, 19, 20 and 21. As a result of the measurement, such a sectional TEM image as depicted in FIG. 7A was obtained and such an element distribution at the points as depicted in FIG. 7B was obtained. It is to be noted that each of values in FIG. 7B is an atomic percentage % of each element. Here, a JEM-2100F transmission electron microscope was used for acquisition of the cross sectional TEM image, and the acceleration voltage as a measurement condition was set to 200 kV.

Then, as depicted in FIG. 7A, it was confirmed that a portion (LLTOS) to which sulfur (S) having a thickness of approximately 10 nm was coupled was formed at a surface portion of particles of the solid electrolyte obtained by performing the surface oxidization process in such a manner as described above, namely, a surface portion of the solid electrolyte material (LLTO-δ) having an oxide deficient portion.

Incidentally, different from the example described above, a sample for which the sulfurization treatment was performed in such a manner as described above was placed statically in an environment of a temperature of 25° C. and a relative humidity different from that described hereinabove for approximately 12 hours. As a result, a solid electrolyte (powder) was obtained.

Here, the relative humidity was set to 0.0015% RH (comparative example 1), 0.025% RH (example 1), 40% RH (example 2), 50% RH (example 3), 60% RH (example 4), 70% RH (example 5), 80% RH (example 6) and 90% RH (example 7). Thus, solid electrolytes were obtained by changing the humidity environment (humidity condition), namely, by changing the oxidization condition (oxidization environment) with water.

It is to be noted that, in the comparative example 1, a sample was placed into a glove box in which the relative humidity was set to 0.0015% RH. Further, in the example 1, a sample was placed into a dry room in which the relative humidity was set to 0.025% RH. Further, in the examples 2 to 7, a sample was placed into a constant temperature room (general laboratory) in which the relative humidity was set to 40, 50, 60, 70, 80 and 90% RH, respectively.

Then, ionic conductivity measurement was performed and the ionic conductivity of the solid electrolytes of the examples 1 to 7 and comparative example 1 obtained in such a manner as described above was evaluated.

The evaluation of the ionic conductivity was performed using an AC impedance method.

In particular, the solid electrolytes of the examples 1 to 7 and comparative example 1 described above were attached to an electrochemical cell having a jig [here, the upper side serves as the electrode terminal (+) and the lower side serves as the electrode terminal (−)] of 10 mmφ for which SKD11 is used as a material. Then, using AUTOLAB FRA (frequency response analysis apparatus) by Metrohm Autolab as an evaluation apparatus, the impedance was measured setting the application voltage, frequency response region and measurement temperature to 0.1 V, 1 MHz to 1 Hz and 25° C. (room temperature), respectively.

Then, one semicircular arc was extrapolated to the data of the measured impedance and the ionic conductivity was calculated setting an intersection point at the right end of the semicircular arc with the Z axis as an intergranular resistance. Here, the thickness of the solid electrolyte (lithium ion conductor) was set to t (cm); the area (electrode area) of the jig used for measurement was set to S (cm$^2$); and the resistance value of the intergranular resistance was set to R (Ω), and the ionic conductivity σ (S/cm) was calculated in accordance with the expression given below. Here, t=0.05 cm and S=0.785 cm$^2$. t (cm)/R (Ω)/S (cm$^2$)=σ(1/Ω·cm)=σ (S/cm)

Figure 8:
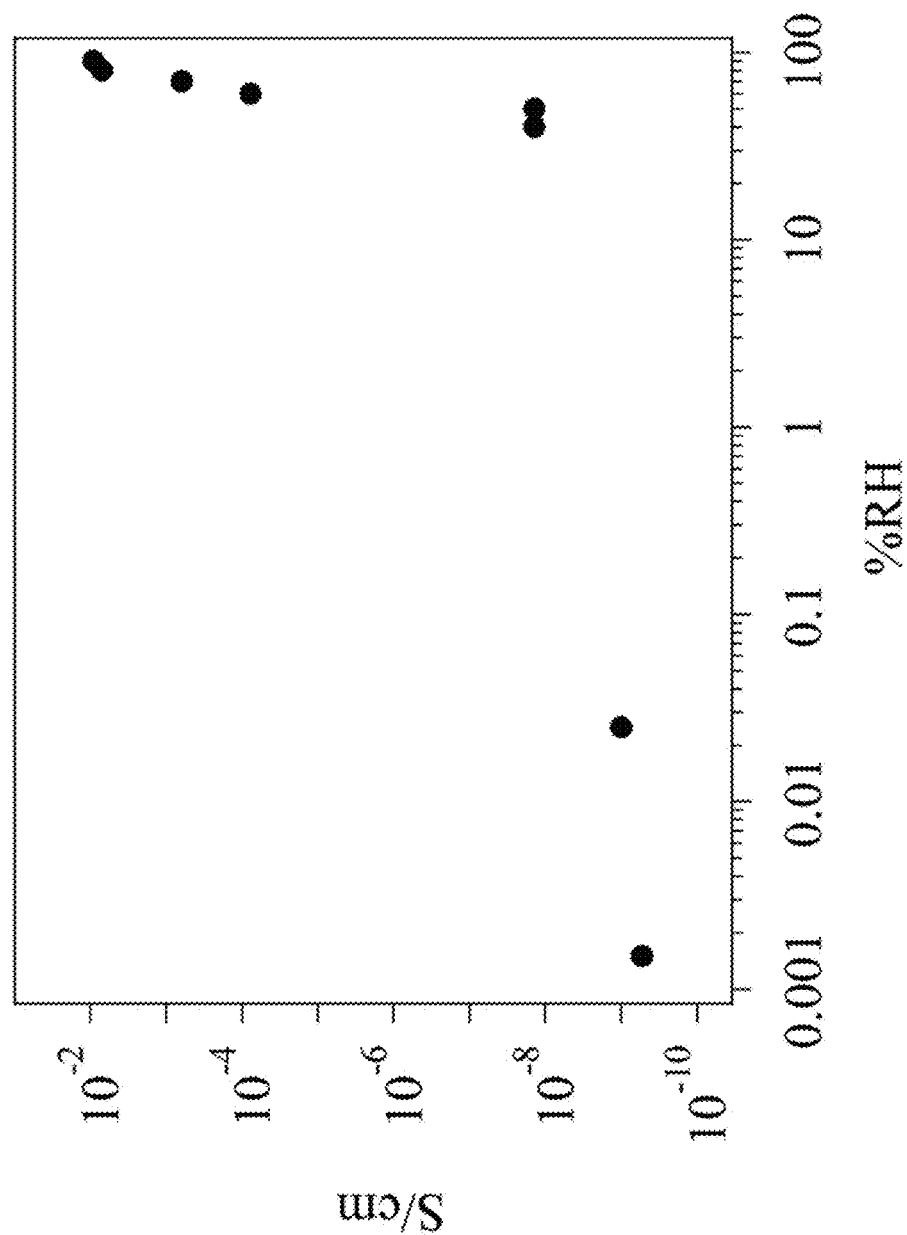
FIG. 8 is a view depicting an ionic conductivity of the solid electrolyte of examples and a comparative example.

Here, FIG. 8 depicts ionic conductivity data in the cases of the examples 1 to 7 and comparative example 1.

As depicted in FIG. 8, the ionic conductivity of the solid electrolyte (comparative example 1) obtained with the relative humidity 0.0015% RH was $5.3 \times 10^{-10}$ S/cm, and the ionic conductivity of the solid electrolyte (example 2) obtained with the relative humidity of 40% RH was $1.4 \times 10^{-8}$ S/cm. Further, the ionic conductivity of the solid electrolyte (example 3) obtained with the relative humidity of 50% RH was $1.4 \times 10^{-8}$ S/cm, and the ionic conductivity of the solid electrolyte (example 4) obtained with the relative humidity of 60% RH was $7.7 \times 10^{-5}$ S/cm. Further, the ionic conductivity of the solid electrolyte (example 5) obtained with the relative humidity of 70% RH was $6.3 \times 10^{-4}$ S/cm, and the ionic conductivity of the solid electrolyte (example 6) obtained with the relative humidity of 80% RH was $7.0 \times 10^{-3}$ S/cm. Furthermore, the ionic conductivity of the solid electrolyte (example 7) obtained with the relative humidity of 90% RH was $9.2 \times 10^{-3}$ S/cm.

Here, it can be determined that, since the solid electrolyte (comparative example 1) obtained with the relative humidity of 0.0015% RH is oxidized little with water, the solid electrolyte of the comparative example 1 is a solid electrolyte for which surface oxidization treatment has not been performed while the solid electrolytes of the examples 1 to 7 are solid electrolytes for which the surface oxidization treatment has been performed. Further, as described above, the solid electrolytes of the examples 1 to 7 for which the processes up to the surface oxidization treatment have been performed are higher in ionic conductivity and enhanced in ionic conductivity in comparison with the solid electrolyte of the comparative example 1 for which the processes up to the surface oxidization treatment have not been performed.

Especially, the solid electrolytes for which the surface oxidization treatment has been performed with the relative humidity of 60 to 90% RH, namely, the solid electrolytes of the examples 4 to 7, indicate a rapid increase in ionic conductivity and a rapid enhancement in ionic conductivity in comparison with the solid electrolytes obtained with the relative humidity of 0.0015, 0.025, 40 and 50% RH, namely, with the solid electrolytes of the comparative example 1 and examples 1 to 3.

Further, for comparison, LLTO powder before reforming for which all treatments described above were not performed was placed statically in an environment of a temperature of 25° C. and a relative humidity of 50% RH for approximately 12 hours to obtain a solid electrolyte (powder). Then, when the impedance was measured in a similar manner as in the embodiment described above and the ionic conductivity was calculated, the ionic conductivity was $1.2 \times 10^{-8}$ S/cm. In contrast, the ionic conductivity of the solid electrolytes (examples 4 to 7) obtained by performance of all treatments described above and static placement in an environment of a temperature of 25° C. and a relative humidity of 60% RH for approximately 12 hours was $10^{-5}$ to $10^{-3}$. Thus, the ionic conductivity increased by three digits or more and the ionic conductivity enhanced rapidly. Also the ionic conductivity of the solid electrolyte obtained by performance of all treatments described above in the example described hereinabove and static placement in an environment of a temperature of 23° C. and a relative humidity of 55% RH for approximately 12 hours was $10^{-5}$. This order does not vary also at a temperature of 25° C., and the ionic conductivity increased by three digits or more and the ionic conductivity enhanced drastically. In this manner, although the ionic conductivity of the solid electrolyte obtained by the surface oxidization treatment for LLTO powder before reforming for which all of the treatments described above were not performed was approximately $10^{-8}$ S/cm, in the solid electrolytes for which all of the treatments described above were performed and for which the surface oxidization treatment was performed under the condition of the relative humidity of 55% RH or more, the ionic conductivity was $10^{-5}$ to $10^{-3}$, and the ionic conductivity increased rapidly and the ionic conductivity enhanced rapidly.

[Production and Evaluation of All-Solid-State Lithium Secondary Battery]

First, $LiCoO_2$ in the form of powder and a solid electrolyte material in the form of powder having a surface reformed as described above were mixed at a ratio of 6:4 to produce a material for the positive electrode 1 [refer to FIG. 9A].

Further, $Li_4Ti_5O_{12}$ in the form of powder and a solid electrolyte material in the form of powder having a surface reformed as described above were mixed at a ratio of 6:4 to produce a material for the negative electrode 2 [refer to FIG. 9A].

Then, as depicted in FIGS. 9A and 9B, the material in the form of powder for the negative electrode 2, the material in the form of powder for the solid electrolyte 3 having a surface reformed in such a manner as described and the material in the form of powder for the positive electrode 1 were disposed in order between jigs (electrodes; electrode terminals) 11 of 10 mmφ provided in an electrochemical cell (compaction cell) 10. Then, a pressure of, for example, 1000 kgf was applied, namely, room temperature compaction molding was performed, to produce an all-solid-state lithium secondary battery. It is to be noted that, in FIG. 9B, reference numeral 12 indicates a cell (cell shell).

Evaluation of charging and discharging of the all-solid-state lithium secondary battery produced in such a manner as described above was performed.

Figure 10:
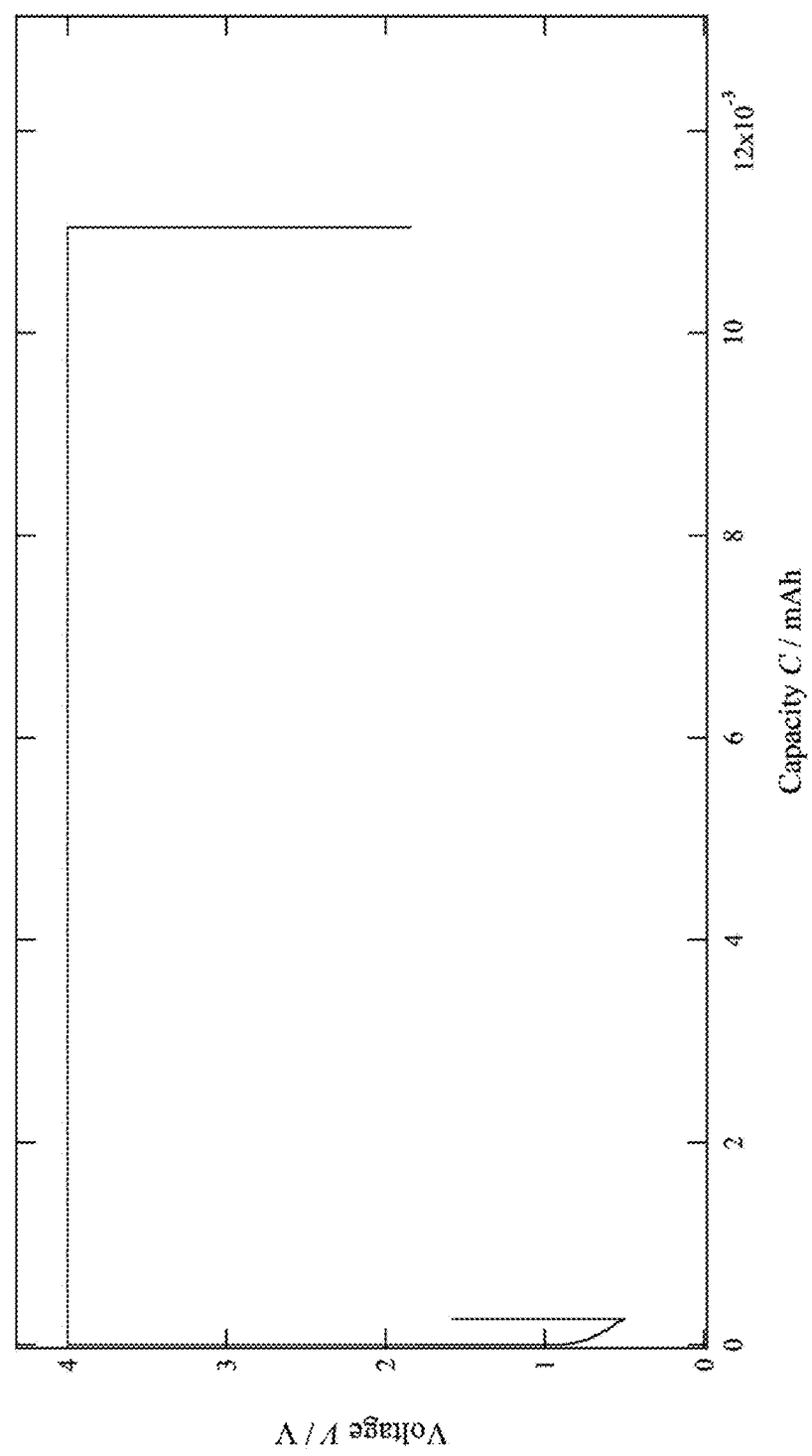
FIG. 10 is a view depicting a charge and discharge curve of the all-solid-state secondary battery of the example.

In the all-solid-state lithium secondary battery produced in such a manner as described above, namely, in the all-solid-state lithium secondary battery including the solid electrolyte 3 whose surface was reformed as described hereinabove, battery operation can be confirmed at a room temperature, and such a charge and discharge curve (charge curve and discharge curve) as depicted in FIG. 10 was obtained and a good load characteristic (output characteristic) was obtained. Here, the evaluation condition was set to a voltage range: 4 to 0.5 V, charging and discharging current: 10 μA for charge and 1 μA for discharge, and an evaluation temperature: 60° C.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An all-solid-state secondary battery, comprising:
   a positive electrode;
   a negative electrode; and
   a solid electrolyte provided between the positive electrode and the negative electrode; wherein
   the solid electrolyte includes a particle having a first portion that includes, as constituent elements, lanthanum (La), lithium (Li), titanium (Ti) and oxygen (O), and a second portion that covers a surface of the first portion and includes, as constituent elements, lanthanum (La), lithium (Li), titanium (Ti) and oxygen (O), wherein sulfur (S) is bonded to an oxygen deficient portion of only the second portion and the particle included in the solid electrolyte includes a layer of LiO or hydrate on at least a surface of the second portion.

2. The all-solid-state secondary battery according to claim 1, wherein a portion of the second portion other than the layer has a defect that traps a lithium ion.

3. The all-solid-state secondary battery according to claim 1, wherein the first portion has an oxygen deficient portion and has electron conductivity.

4. The all-solid-state secondary battery according to claim 1, wherein
   the positive electrode includes a particle having a third portion that includes, as constituent elements, lanthanum (La), lithium (Li), titanium (Ti) and oxygen (O), and a fourth portion that covers a surface of the third portion and includes, as constituent elements, lanthanum (La), lithium (Li), titanium (Ti) and oxygen (O), wherein sulfur (S) is bonded to an oxygen deficient portion of the fourth portion and the particle includes a layer of LiO or hydrate on at least a surface of the fourth portion;
   the negative electrode includes further another particle having a fifth portion that includes, as constituent elements, lanthanum (La), lithium (Li), titanium (Ti) and oxygen (O), and a sixth portion that covers a surface of the fifth portion and includes, as constituent elements, lanthanum (La), lithium (Li), titanium (Ti) and oxygen (O), wherein sulfur (S) is bonded to an oxygen deficient portion of the sixth portion and the further another particle includes a layer of LiO or hydrate on at least a surface of the sixth portion.

* * * * *